United States Patent [19]

Togo et al.

[11] Patent Number: 4,914,153

[45] Date of Patent: Apr. 3, 1990

[54] SOLVENT-RESISTANT POLYPHENYLENE ETHER RESIN COMPOSITION

[75] Inventors: Shizuo Togo, Ichikawa; Akikazu Amagai, Tokyo; Yoshinori Kondo, Tokyo; Toshiaki Yamada, Tokyo, all of Japan

[73] Assignee: Mitsubishi Gas Chemical Company, Inc., Tokyo, Japan

[21] Appl. No.: 122,235

[22] Filed: Nov. 17, 1987

[30] Foreign Application Priority Data

Nov. 19, 1986 [JP] Japan ................................. 61-273958

[51] Int. Cl.$^4$ ....................... C08L 51/06; C08L 71/04
[52] U.S. Cl. ......................................... 525/68; 525/65; 525/145; 525/396; 525/397; 525/905
[58] Field of Search ............................ 525/68, 905, 65

[56] References Cited

U.S. PATENT DOCUMENTS

| | | | |
|---|---|---|---|
| 4,454,284 | 6/1984 | Ueno et al. | 525/905 |
| 4,661,559 | 4/1987 | Gardner et al. | 525/905 |
| 4,732,937 | 3/1988 | Sybert | 525/68 |

*Primary Examiner*—Jacob Ziegler
*Attorney, Agent, or Firm*—Wenderoth, Lind & Ponack

[57] ABSTRACT

A polyphenylene ether resin composition having improved solvent resistance comprising (A) a modified polyphenylene ether obtained by modifying a polyphenylene ether with a modifier such as maleic anhydride and (B) a modified polyolefin obtained by modifying a polyolefin with both a modifier such as maleic anhydride and a vinyl or vinylidene compound such as styrene, and optionally (C) a binder such as phenylenediamine.

4 Claims, No Drawings

SOLVENT-RESISTANT POLYPHENYLENE ETHER RESIN COMPOSITION

This invention relates to a novel polyphenylene ether resin composition having excellent solvent resistance in addition to excellent mechanical strength and moldability. More specifically, it relates to a novel polyphenylene ether resin composition having improved solvent resistance comprising a modified polyphenylene ether and a modified polyolefin and having excellent mechanical strength and moldability.

Polyphenylene ethers are polymeric materials having superior thermal resistance and being useful as engineering plastics. It is well known however that polyphenylene ethers have inferior solvent resistance and poor moldability.

As a technique of improving the moldability or flow characteristics, of polyphenylene ether, U.S. Pat. No. 3,383,435 discloses the blending of a polystyrene resin. Japanese Laid-Open Patent Publication No. 12894/1977 discloses the blending of a rubber-reinforced copolymer of styrene compound and an alpha,beta-unsaturated dicarboxylic acid anhydride. These techniques, however, have not resulted in improvement of the solvent resistance of polyphenylene ethers.

U.S. Pat. No. 3,361,851 discloses a technique of improving the solvent resistance of a polyphenylene ether by blending it with a polyolefin. Since the polyphenylene ether has poor compatibility with the polyolfein, only up to 10% by weight, based on the total weight of the two resins, of the polyolefin can be blended, and the solvent resistance and moldability of the polyphenylene ether cannot be satisfactorily improved by this technique.

Various attempts have been made to improve the compatibility of the polyolefin with the polyphenylene ether and the solvent resistance and moldability of the polyphenylene ether resin composition by incorporating a large amount of the polyolefin into polyphenylene ether. For example, Japanese Patent Publication No. 22344/1981 discloses a technique of grafting a styrene compound to a polyolefin and incorporating the grafted polyolefin in a polyphenylene ether. Japanese Laid-Open Patent Publications Nos. 108153/1982 and 225150/1983 disclose a technique of blending a polyolefin having glycidyl methacrylate or the like copolymerized therewith with a polyphenylene ether. Japanese Laid-Open Patent Publication No. 260649/1985 discloses a technique of blending a polymer having a glycidyl group and a polyolefin having a group capable of reacting with the glycidyl group with a polyphenylene ether. Japanese Laid-Open Patent Publication No. 47748/1986 discloses a technique of blending a modified copolymer obtained by polymerizing a copolymer of glycidyl (meth)acrylate and an olefin with a styrene compound, with a polyphenylene ether. These prior techniques are directed to the improvement of the compatibility of a polyolefin by incorporating a styrene structure and/or a glycidyl structure having excellent compatibility with a polyphenylene ether. Certainly, they resulted in a certain degree of improvement in compatibility, but the solvent resistance and mechanical strength of polyphenylene ethers were not sufficiently improved. Hence, no practically satisfactory molding material of a blend of a polyphenylene ether with a modified polyolefin can be obtained by this technique. This is presumably because these modifying techniques rely only on the modification of the polyolefin and no modification is carried out on the polyphenylene ether, and consequently, no positive chemical bond is formed between the polyphenylene ether and the polyolefin.

It is an object of this invention to provide a novel resin composition of a polyphenylene ether and a polyolefin having improved solvent resistance with improved compatibility between the two. Specifically, by introducing a chemical bond between the polyphenylene ether and the polyolefin resin, the invention provides a polyphenylene ether resin composition having good solvent resistance and mechanical strength as well as good moldability.

According to this invention, there is provided a composition comprising (A) a modified polyphenylene ether obtained by modifying a polyphenylene ether with a modifier selected from organic compounds having in the molecule (a) an ethylenic double bond and (b) a functional group selected from the class consisting of a carboxyl group, an acid anhydride group and an epoxy group in the presence or absence of a radical initiator, and (B) a modified polyolefin obtained by modifying a polyolefin with both a modifier selected from organic compounds having in the molecule (a) an ethylenic double bond and (b) a functional group selected from the class consisting of a carboxyl group, an acid anhydride group, an epoxy group and an alcoholic hydroxyl group and a vinyl or vinylidene compound in the presence or absence of a radical initiator.

This resin composition shows not only excellent solvent resistance but also excellent moldability and mechanical properties as a result of a marked improvement in the compatibility of the polyphenylene ether with the polyolefin.

In a preferred embodiment, a resin composition having a further improved solvent resistance and mechanical properties is provided by further incorporating (C) a binder selected from organic compounds having in the molecule at least two functional groups selected from the class consisting of a carboxyl group, ester groups, an amide group, a hydroxyl group, an amino group, a mercapto group and an epoxy group.

The modified polyphenylene ether and the modified polyolefin used in the resin composition of this invention denote a polyphenylene ether and a polyolefin modified by the methods to be described hereinafter.

The polyphenylene ether may be a homopolymer or a copolymer and is obtained by polycondensing at least one substituted monocyclic phenol of general formula (I).

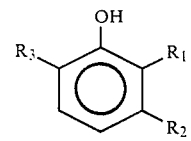

wherein $R_1$ represents an alkyl group having 1 to 3 carbon atoms, and $R_2$ and $R_3$ each represent a hydrogen atom or an alkyl group having 1 to 3 carbon atoms.

Examples of the substituted monocyclic phenol of general formula (I) include 2,6-dimethylphenol, 2,6-diethylphenol, 2,6-dipropylphenol, 2-methyl-6-ethylphenol, 2-methyl-6-propylphenol, 2-ethyl-6-propylphenol, o-cresol, 2,3-dimethylphenol, 2,3-diethylphenol, 2,3-dipropylphenol, 2-methyl-3-ethylphenol, 2-methyl-3-propylphenol, 2-ethyl-3-methylphenol, 2-ethyl-2-propylphenol, 2-propyl-3-methylphenol, 2-propyl-3-ethylphenol, 2,3,6-trimethylphenol, 2,3,6-triethylphenol, 2,3,6-tripropylphenol, 2,6-dimethyl-3-ethylphenol and 2,6-dimethyl-3-propylphenol. Thus, illustrative of polyphenylene ethers obtained by polycondensing at least one of these phenols are poly(2,6-dimethyl-1,4-phenylene)ether, poly(2,6-diethyl-1,4-phenylene)ether, poly(2,6-dipropyl-1-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, 2,6-dimethylphenol/2,3,6-trimethylphenol copolymer, 2,6-dimethylphenol/2,3,6-triethylphenol copolymer, 2,6-diethylphenol/2,3,6-trimethylphenol copolymer, and 2,6-dipropylphenol/2,3,6-trimethylphenol copolymer.

Poly(2,6-dimethyl-1,4-phenylene)ether and 2,6-dimethylphenol/2,3,6-trimethylphenol copolymer are especially preferred for use in this invention.

The polyolefin as used herein is a crystalline or amorphous olefin polymer. Specific examples include homopolymers of olefins such as polypropylene, low-density polyethylene, high density polyethylene, linear low-density polyethylene, propylene/ethylene copolymer, and poly-4-methylpentene-1; and copolymers of a predominant proportion of olefins with vinyl monomers copolymerizable therewith such as acrylic esters, methacrylic esters and glycidyl (meth)acrylate. These polyolefins are used either singly or in combination. Of these polyolefins, polyethylene and polypropylene are preferred. Polypropylene is especially preferred. These polyolefins may be produced by methods known to those skilled in the art, for example the methods described in ENCYCLOPEDIA OF POLYMER SCIENCE AND TECHNOLOGY, volume 6, page 275 (1967) and volume 11, page 597 (1969), published by John Wiley & Sons, Inc.

The "modifier" for the polyphenylene ether is an organic compound having in the molecule (a) an ethylenic double bond and (b) functional group selected from the class consisting of a carboxyl acid, an acid anhydride group and an epoxy group. Specific examples include alpha,beta-unsaturated dicarboxylic acids such as maleic acid, chloromaleic acid, citraconic acid and itaconic acid; unsaturated monocarboxylic acids such as acrylic acid, crotonic acid, vinylacetic acid, methacrylic acid, pentenoic acid and angelic acid; anhydrides of these alpha,beta-unsaturated dicarboxylic acids and unsaturated monocarboxylic acids; unsaturated epoxy compounds which are the reaction products between epichlorohydrin and the above alpha,beta-unsaturated dicarboxylic acids or unsaturated monocarboxylic acids, for example glycidyl maleate, glycidyl acrylate and glycidyl methacrylate. Maleic acid, acrylic acid, methacrylic acid, maleic anhydride, glycidyl methacrylate and glycidyl acrylate are preferred, and maleic anhydride, glycidyl methacrylate and glycidyl acrylate are especially preferred.

The modifier for the polyolefin used in this invention is selected from the aforesaid organic modifier compounds for the polyphenylene ether and in addition, organic compounds having (a) an ethylenic double bond and (b) an alcoholic hydroxyl group in the molecules (unsaturated alcohol compounds). Specific examples of these compounds include hydroxy unsaturated monocarboxylic acid esters derived from the aforesaid unsaturated monocarboxylic acids and aliphatic diols such as ethylene glycol, propylene glycol, trimethylene glycol, butane-1,4-diol, tetramethylene glycol or pentamethylene glycol or aliphatic polyols such as glycerol, trimethylolpropane and pentaerythritol; polyhydroxy-alpha,beta-unsaturated dicarboxylic acid diesters derived from the aforesaid alpha,beta-unsaturated dicarboxylic acids and the aforesaid aliphatic diols or polyols; hydroxy unsaturated monocarboxylic acid amides derived from the aforesaid unsaturated monocarboxylic acids and aliphatic aminoalcohols; amides or imides of hydroxy-alpha,beta-unsaturated dicarboxylic acids derived from alpha,beta-unsaturated dicarboxylic acids and aliphatic aminoalcohols; and aliphatic unsaturated alcohols such as allyl alcohol, crotyl alcohol, methyl vinyl carbinol, methyl allyl carbinol and methyl propenyl carbinol. Of these organic compounds, the hydroxy unsaturated monocarboxylic acid esters and polyhydroxy-alpha,betaunsaturated dicarboxylic acid diesters are preferred. Specific examples of the these organic compounds are 2-hydroxyethyl acrylate, 2-hydroxyethyl methacrylate, 2-hydroxypropyl acrylate, 2-hydroxypropyl methacrylate, bis-2-hydroxyethyl maleate and bis-2-hydroxypropyl maleate.

The vinyl or vinylidene compound used in combination with the modifier for the polyolefin denotes an alph,beta-unsaturated compound having a polymerizable vinyl or vinylidene group, which is not encompassed within the above modifiers. Examples of the vinyl or vinylidene compound include aromatic vinyl or vinylidene compounds such as styrene, alpha-methylstyrene, methylstyrene, chlorostyrene, bromostyrene, divinylbenzene, hydroxystyrene and aminostyrene; alkyl (meth)acrylates such as methyl (meth)acrylate, ethyl (meth)acrylate, propyl (meth)acrylate and octyl (meth)acrylate; cyanovinyl compounds such as acrylonitrile and methacrylonitrile; vinyl esters such as vinyl acetate; and vinyl ethers such as methyl vinyl ether, ethyl vinyl ether and butyl vinyl ether. Of these, the aromatic vinyl or vinylidene compounds and alkyl (meth)acrylates are preferred, and styrene is most preferred.

The modified polyphenylene ether and the modified polyolefin used in this invention can be prepared, for example by the following methods. For example, the modified polyphenylene ether may be prepared by melt-kneading and thus reacting the polyphenylene ether and the modifier at a temperature of 150° to 350° C. in a roll mill, a Banbury mixer, an extruder or the like; or by reacting the polyphenylene ether and the modifier under heat in a solvent such as benzene, toluene, xylene, decalin or tetralin. Likewise, the modified polyolefin can be prepared by melt-kneading and thus reacting the polyolefin, the modifier and the vinyl or vinylidene compound at a temperature of 150° to 300° C. in a roll mill, a Banbury mixer, an extruder or the like; or by reacting them under heat in a solvent such as benzene, toluene, xylene, decalin or tetralin. The presence of a radical initiator, for example an organic peroxide such as benzoyl peroxide, di-t-butyl peroxide, dicumyl peroxide oxide or t-butyl peroxybenzoate, or an azo compound such as azobisisobutyronitrile or azobisisovaleronitrile in the reaction system is effective for carrying out the modifying reaction easily. A more practical modifying method is the melt-kneading in the presence of a radical initiator.

To improve the properties of the resin composition of this invention including solvent resistance further, incorporation of a binder (C) is effective. The binder (C) denotes an organic compound containing in the molecule at least two functional groups selected from a carboxyl group, an ester group, an amide group, a hydroxyl group, an amino group, a mercapto group and an epoxy group. In this binder compound, two carboxyl groups may form an acid anhydride group. Specific examples of the binder include aromatic polycarboxylic acids such as terephthalic acid, isophthalic acid, phthalic acid, p-carboxyphenylacetic acid, p-phenyenediacetic acid, m-phenylenediglycollic acid, p-phenylenediglycollic acid, diphenyldiacetic acid, diphenyl-p,p'-dicarboxylic acid, diphenyl-m,m'-dicarboxylic acid, diphenyl-4,4'-diacetic acid, diphenylmethane-p,p'-dicarboxylic acid, diphenylethane-p,p'-dicarboxylic acid, stilbenedicarboxylic acid, benzophenone-4,4'-dicarboxylic acid, naphthalene-1,4-dicarboxylic acid, naphthalene-1,5-dicarboxylic acid, naphthalene-2,6-dicarboxylic acid, naphthalene-2,7-dicarboxylic acid, p-carboxyphenoxyacetic acid and trimellitic acid; aliphatic polycarboxylic acids such as oxalic acid, succinic acid, adipic acid, cork acid, azelaic acid, sebacic acid, dodecanedicarboxylic acid and undecanecarboxylic acid; anhydrides of these aromatic or aliphatic polycarboxylic acids; aliphatic polyol compounds such as ethylene glycol, propylene glycol, trimethylene glycol, butane-1,3-diol, butane-1,4-diol, 2,2-dimethylpropane-1,3-diol, cis-2-butene-1,4-diol, trans-2-butene-1,4-diol, tetramethylene glycol, pentamethylene glycol, hexamethylene glycol, heptamethylene glycol, octamethylene glycol, decamethylene glycol, glycerol, trimethylolpropane and pentaerythritol; aromatic polyhydroxy compounds such as hydroquinone, resorcinol, catechol, m-xylylenediol, p-xylylenediol, 4,4'-dihydroxybiphenyl, 4,4'-dihydroxybiphenyl ether, bisphenol A, bisphenol S, bisphenol F, pyrogallol and phloroglycine; aliphatic polyamines such as ethylenediamine, propylenediamine and hexamethylenediamine; aromatic polyamine compounds such as m-phenylenediamine, p-phenylenediamine, tolylenediamine, m-xylylenediamine and p-xylylenediamine; epoxy compounds such as bisphenol A diglycidyl ether, epoxy resins and diglycidyl terephthalate; and polymercaptan compounds such as ethanedithiol, 1,4-butanedithiol, trithioglycerin, dithiocatechol, dithioresorcinol, dithioquinol and trithiophloroglycine.

The binder (C) used in this invention is not limited to the above compounds, and, for example, compounds having at least two kinds of the above functional groups per molecule may also be used. Examples include aminocarboxylic acids, hydroxycarboxylic acids, mercaptocarboxylic acids, aminobenzoic acids, hydroxybenzoic acids, mercaptobenzoic acids, aminoalcohols, and hydroxyanilines. The reaction products of the above binders with each other, for example a hydroxycarboxylic acid compound obtained by reacting a polycarboxylic acid compound and polyol compound, may be equally used as the binder (C).

Among the above compounds, terephthalic acid, isophthalic acid, phthalic anhydride, trimellitic anhydride, pyromellitic anhydride, phenylenediamines, xylylenediamines, hexamethylenediamine, bisphenols, aminobenzoic acids, hydroxybenzoic acids and diepoxy compounds are preferred because they are easily available and give desirable properties.

The modified polyphenylene ether (A) and the modified polyolefin (B) can be easily mixed in any desired ratios. But to achieve the object of this invention, the amount of the modified polyphenylene ether should be 5 to 95% by weight, preferably 20 to 80% by weight, based on the total amount of the two. When the binder (C) is to be further mixed, its amount is 0.01 to 10% by weight, preferably 0.01 to 5% by weight, based on the total amount of the components (A), (B) and (C).

The amount of the modifier used in modifying the polyphenylene ether is 0.001 to 20% by weight, preferably 0.01 to 10% by weight, more preferably 0.01 to 5% by weight, based on the total amount of the polyphenylene ether and the modifier. The total amount of the modifier and the vinyl or vinylidene compound used in modifying the polyolefin is 0.01 to 50% by weight, preferably 0.01 to 30% by weight, more preferably 0.1 to 20% by weight, based on the total amount of the polyolefin, the modifier and the vinyl or vinylidene compound. The ratio between the modifier and the vinyl or vinylidene compound is such that the proportion of the modifier is 1 to 90% by weight, preferably 10 to 50% by weight, based on the total weight of the two. Where a radical initiator is used in the modification of the polyphenylene ether and the polyolefin, the amount of the radical initiator is 0.01 to 5 parts by weight, preferably 0.01 to 3 parts by weight, per 100 parts by weight of the polyphenylene ether or the polyolefin.

In order to permit the unique properties of the resin composition of this invention to be exhibited more effectively, organic amines such as trimethylamine, triethylamine, tri-n-butylamine and pyridine may be incorporated as adjuvants in the composition of this invention.

As required, the resin composition of this invention may further include another resin, an elastomer, and various additives such as fire retardants, fireretardant aids, stabilizers, ultraviolet absorbers, plasticizers, lubricants, pigments, and fillers.

The following Referential Examples, Examples and Comparative Examples illustrate the polyphenylene ether resin compositions provided by this invention

REFERENTIAL EXAMPLE 1

Production of modified yphenylene ether:

Maleic anhydride (90 g) and 15 g of dicumyl peroxide were added to 3 kg of a 2,6-dimethylphenol/2,3,6-trimethylphenol copolymer (containing 5 mole % of 2,3,6-trimethylphenol) having an intrinsic viscosity of 0.47 dl/g, measured in chloroform at 25° C., and they were mixed by a Henschel mixer. In a twin-screw extruder, the mixture was melt-kneaded at a temperature of 300° to 320° C. and pelletized.

Two grams of the pellets were dissolved in 50 ml of chloroform, and 500 ml of methanol was added to the solution to precipitate the polymer. The polymer was separated by filtration and dried at 80° C. under reduced pressure for 10 hours. The resulting sample was analyzed by infrared-absorption spectroscopy. The amount (% by weight) of maleic anhydride bonded to the polyphenylene ether was calculated by using a calibration curve obtained with polyphenylene ether and maleic anhydride. The amount of the bonded maleic anhydride so measured was 1.1% by weight.

REFERENTIAL EXAMPLE 2

Production of modified polyphenylene ether:

Referential Example 1 was repeated except that dicumyl peroxide was not used. The amount of maleic anhydride bonded was 0.7% by weight.

REFERENTIAL EXAMPLE 3

Production of modified polyphenylene ether:

Referential Example 1 was repeated except that 90 g of glycidyl methacrylate was used instead of 90 g of maleic anhydride. A calibration curve of infrared-absorption spectroscopy was prepared from the results obtained with polyphenylene ether and glycidyl methacrylate. The amount of glycidyl methacrylate bonded was 1.3% by weight.

REFERENTIAL EXAMPLE 4

Production of modified polypropylene:

Three kilograms of polypropylene ("Idemitsu Polypro E-250G" produced by Idemitsu Petrochemical Co., Ltd.; melt index 1.0 g/10 min., density 0.90 g/cm$^3$) was mixed well with 90 g of maleic anhydride, 300 g of styrene and 15 g of dicumyl peroxide, and in a twin-screw extruder at 180° to 220° C., the mixture was melt-kneaded and pelletized. Four grams of the pellets were extracted with methyl ethyl ketone for 24 hours using a Soxhlet extractor. The extraction residue was dried at 80° C. under reduced pressure for 10 hours, and then its weight was measured. The extraction residue was subjected to infrared-absorption spectroscopy, and by using a calibration curve obtained with polypropylene, polystyrene and maleic anhydride, the amount (% by weight) of styrene and maleic anhydride bonded to polypropylene were calculated. The total amount of bonded maleic anhydride and styrene so determined was 6.5% by weight.

REFERENTIAL EXAMPLE 5

Production of modified polypropylene:

Referential Example 4 was repeated except that 90 g of glycidyl methacrylate was used instead of 90 g of maleic anhydride. A calibration curve of infrared-absorption spectroscopy was obtained with polypropylene, polystyrene and glycidyl methacrylate. The total amount of styrene and glycidyl methacrylate bonded was 6.2% by weight.

EXAMPLE 1

A mixture of 25 g of the maleic anhydride-modified polyphenylene ether pellets obtained in Referential Example 1 and 25 g of the modified polypropylene pellets obtained in Referential Example 5 was melt-kneaded at 270° C. and 60 rpm for 10 minutes using a laboplastomill. A 0.3 mm thick sheet was prepared by press-forming the resulting resin composition at 270° C. under a pressure of 200 kg/cm$^2$. A test piece described in ASTM D412 C was punched out and its tensile strength and elongation were measured.

The resin composition was extracted with chloroform as a solvent using a Soxhlet extractor. The extraction residue was dried at 80° C. under reduced pressure for 10 hours, and then its weight was measured. The proportion of a chloroform-insoluble portion was calculated on the basis of the difference of the measured weight from the weight of the resin composition before extraction, and made a measure of evaluation of its solvent resistance. By a Koka-type flow tester, the melt flow value (cc/sec) of the resin composition at 230° C. under a load of 60 kg was measured.

The results are shown in Table 1. A comparison of these results with those of Comparative Examples 1 to 4 given hereinbelow shows that the resin composition of this invention has an excellent balance among solvent resistance, mechanical strength and moldability not seen in conventional polyphenylene ether/polyolefin compositions, and judging from its elongation, it also has excellent compatibility. Incidentally, a composition composed of unmodified polyphenylene ether and polystyrene in a weight ratio of 50:50 has a melt flow value of $2.0 \times 10^{-3}$ cc/sec.

EXAMPLE 2

A mixture composed of 49.5% by weight of the modified polyphenylene ether obtained in Referential Example 2, 49.5% by weight of modified polypropylene obtained in Referential Example 5, and 1% by weight of p-phenylenediamine was melt-kneaded in the same way as in Example 1, and molded to prepare test specimens. The properties of the test specimens were measured, and the results are shown in Table 1.

A 0.1 mm thick sample cut out from the composition obtained by melt-kneading was observed under an electron microscope. It was determined that the modified polyphenylene ether was dispersed in particles having a size of about 0.5 to 1.5 micrometers. In contrast, in the sample obtained in Comparative Example 4, the dispersed polyphenylene ether had a size of about 5 to 10 micrometers.

COMPARATIVE EXAMPLE 1

Example 1 was repeated except that the unmodified polyphenylene ether used in Referential Example 1 and the unmodified polypropylene used in Referential Example 4 were used instead of the modified polyphenylene ether and the modified polyolefin respectively. The results are shown in Table 1.

REFERENTIAL EXAMPLE 6

Production of modified polypropylene using only a vinyl compound:

Referential Example 5 was repeated except that glycidyl methacrylate was not used. The amount of styrene bonded was 5.5% by weight.

REFERENTIAL EXAMPLE 7

Production of modified polypropylene using only the modifier:

Referential Example 5 was repeated except that styrene was not used. The amount of the modifier bonded was 0.7% by weight.

COMPARATIVE EXAMPLE 2

Comparative Example 1 was repeated except that the modified polypropylene obtained in Referential Example 6 was used instead of the unmodified polypropylene. The results are shown in Table 1.

COMPARATIVE EXAMPLE 3

Comparative Example 1 was repeated except that the modified polypropylene obtained in Referential Example 7 was used instead of the unmodified polypropylene. The results are shown in Table 1.

COMPARATIVE EXAMPLE 4

Comparative Example 1 was repeated except that the modified polypropylene obtained in Referential Example 5 was used instead of the unmodified polypropylene. The results are shown in Table 1.

TABLE 1

| Ex. (Example) or CEx. (Comparative Example) | Tensile strength (kg/cm²) | Elongation (%) | Chloroform-insoluble portion (wt. %) | Melt flow value (cc/sec.) |
| --- | --- | --- | --- | --- |
| Ex. 1 | 360 | 7.2 | 70 | 0.45 |
| Ex. 2 | 430 | 20.6 | 82 | 0.1 |
| CEx. 1 | 180 | 3.1 | 49 | — |
| CEx. 2 | 250 | 3.3 | 48 | 0.20 |
| CEx. 3 | 100 | 2.0 | 48 | 0.58 |
| CEx. 4 | 270 | 5.1 | 47 | 0.25 |

EXAMPLES 3 AND 5

Example 1 was repeated except that the modified polyphenylene ether and the modified polypropylene were used in the proportions shown in Table 2. The results are shown in Table 2.

EXAMPLES 4 AND 6

Example 2 was repeated except that the modified polyphenylene ether, modified polypropylene and p-phenylenediamine were used in the proportions shown in Table 2.

COMPARATIVE EXAMPLES 5–6

Comparative Example 4 was repeated except that the polyphenylene ether and modified polypropylene were used in the proportions shown in Table 2. The results are also shown in Table 2.

TABLE 2

| | Composition (% by weight) | Tensile strength (kg/cm²) | Elongation (%) | Chloroform-insoluble portion (wt. %) | Melt flow value (cc/sec) |
| --- | --- | --- | --- | --- | --- |
| Ex. 3 | MAH-modified PPE/GM.St-modified PP (70/30) | 385 | 6.8 | 50 | 0.22 |
| Ex. 4 | MAH-modified PPE/Gm.St-modified PP/p-phenylenediamine (69.5/29.5/1) | 450 | 13.3 | 51 | 0.07 |
| CEx. 5 | PPE/GM.St-modified PP (70/30) | 300 | 3.8 | 28 | 0.16 |
| Ex. 5 | MAH-modified PPE/GM.St-modified PP (30/70) | 329 | 8.7 | 85 | 0.54 |
| Ex. 6 | MAH-modified PPE/GM.St-modified PP/p-phenylenediamine (29.5/69.5/1) | 405 | 21.4 | 87 | 0.23 |
| CEx. 6 | PPE/GM.St-modified PP (30/70) | 297 | 5.8 | 68 | 0.46 |

Note
MAH: maleic anhydride;
GM: glycidyl methacrylate;
St: styrene;
PPE: polyphenylene ether;
PP: polypropylene.

EXAMPLE 7

Example 2 was repeated except that 49% by weight of the modified polyphenylene ether, 49% by weight of the modified polypropylene, and 2% by weight of p-aminobenzoic acid instead of p phenylenediamine as a binder were used, and 0.5 part by weight, per 100 parts by weight of the mixture of the above compounds, of tri-n-butylamine was added as a reaction aid. The results are shown in Table 3.

EXAMPLE 8

Example 7 was repeated except that bisphenol A was used as the binder. The results are shown in Table 3.

The effect of the binders was seen in Examples 2, 7 and 8.

EXAMPLE 9

Example 1 was repeated except that the modified polyphenylene ether obtained in Referential Example 3 and the modified polypropylene obtained in Referential Example 4 were used as the resin components. The results are shown in Table 3.

EXAMPLES 10 AND 11

Example 9 was repeated except that the proportion of each of the modified polyphenylene ether and the modified polypropylene was decreased to 49% by weight, and as a binder, 2% by weight of p-phenylenediamine (Example 10) or bisphenol A (Example 11) was added. The results are shown in Table 3.

EXAMPLE 12

Example 8 was repeated except that 48% by weight of the modified polyphenylene ether obtained in Referential Example 2, 48% by weight of the modified polypropylene obtained in Referential Example 4 and 4% by weight of bisphenol A as a binder were mixed, and 0.5 part by weight, per 100 parts by weight of the mixture, of tri-n-butylamine as a reaction aid was added. The results are shown in Table 3.

EXAMPLE 13

Example 10 was repeated except that the modified polyphenylene ether obtained in Referential Example 3 and the modified polypropylene obtained in Referential Example 5 were used. The results are shown in Table 3.

EXAMPLE 14

Example 12 was repeated except that the modified polyphenylene ether obtained in Referential Example 3, the modified polypropylene obtained in Referential Example 5 and terephthalic acid as a binder were used. The results are shown in Table 3.

EXAMPLE 15

Example 12 was repeated except that an epoxy resin ("Epikote 1009", a product of Yuka-Shell Co., Ltd.)

was used instead of bisphenol A as a binder. The results are shown in Table 3.

TABLE 3

| Example | Tensile strength (kg/cm$^2$) | Tensile elongation (%) | Chloroform-insoluble portion (wt. %) |
|---|---|---|---|
| 7 | 308 | 14.7 | 73 |
| 8 | 324 | 15.5 | 67 |
| 9 | 310 | 7.3 | 66 |
| 10 | 363 | 10.4 | 76 |
| 11 | 349 | 12.9 | 74 |
| 12 | 290 | 9.8 | 69 |
| 13 | 310 | 11.0 | 70 |
| 14 | 325 | 12.4 | 75 |
| 15 | 337 | 14.6 | 79 |

REFERENTICAL EXAMPLE 8

Production of modified polypropylene:

Three kilograms of polypropylene ("Idemitsu Polypro E-250G" produced by Idemitsu Petrochemical Co., Ltd.; melt index 1.0 g/10 min., density 0.90 g/cm$^3$) was mixed well with 90 g of 2-hydroxyethyl acrylate, 300 g of styrene and 15 g of dicumyl peroxide, and in a twin-screw extruder at 180° to 220° C., the mixture was melt-kneaded and pelletized. Four grams of the pellets were extracted with chloroform for 24 hours using a Soxhlet extractor. The extraction residue was dried at 80° C. under reduced pressure for 10 hours, and then its weight was measured. The extraction residue was subjected to infrared-absorption spectroscopy, and by using a calibration curve obtained with polypropylene, polystyrene and 2-hydroxyethyl acrylate, the amount (% by weight) of styrene and 2-hydroxyethyl acrylate bonded to polypropylene were calculated. The amount of bonded styrene was 6.5% by weiht, and the amount of bonded 2-hydroxyethyl acrylate was 1.9% by weight.

REFERENTIAL EXAMPLE 9

Production of modified polypropylene:

Referential Example 8 was repeated except that the amount of 2-hydroxyethyl acrylate was changed to 120 g. The amount of bonded styrene was 6.2% by weight, and the amount of 2-hydroxyethyl acrylate bonded was 3.5% by weight.

REFERENTIAL EXAMPLE 10

Production of modified polypropylene:

Referential Example 8 was repeated except that 2-hydroxypropyl methacrylate was used instead of 2-hydroxyethyl acrylate. The amount of bonded styrene was 6.2% by weight, and the amount of bonded 2-hydroxypropyl methacrylate was 2% by weight.

REFERENTIAL EXAMPLE 11

Referential Example 8 was repeated except that 160 g of bis-2-hydroxyethyl maleate was used instead of 90 g of 2-hydroxyethyl acrylate. The amount of bonded styrene was 6.1% by weight, and the amount of bonded bis-2-hydroxyethyl maleate was 2.5% by weight.

EXAMPLE 16

A mixture of 25 g of the maleic anhydride-modified polyphenylene ether pellets obtained in Referential Example 2 and 25 g of the modified polypropylene pellets obtained in Referential Example 8 was melt-kneaded at 270° C. and 60 rpm for 10 minutes using a laboplastomill. A 0.3 mm thick sheet was prepared by press-forming the resulting resin composition at 270° C. under a pressure of 200 kg/cm$^2$. A test piece described in ASTM D412 C was punched out and its tensile strength and elongation were measured.

The resin composition was extracted with chloroform as a solvent using a Soxhlet extractor. The extraction residue was dried at 80° C. under reduced pressure for 10 hours, and then its weight was measured. The proportion of a chloroform-insoluble portion was calculated on the basis of the difference of the measured weight from the weight of the resin composition before extraction, and made a measure of evaluation of its solvent resistance. By a Koka-type flow tester, the melt flow value (cc/sec) of the resin composition at 230° C. under a load of 60 kg was measured.

The results are shown in Table 4. A comparison of these results with those of Comparative Examples 1, 2, 7 and 8 given in Table 4 shows that the resin composition of this invention has an excellent balance among solvent resistance, mechanical strength and moldability not seen in conventional polyphenylene ether/polyolefin compositions, and judging from its elongation, it also has excellent compatibility. Incidentally, a composition composed of unmodified polyphenylene ether and polystyrene in a weight ratio of 50:50 has a melt flow value of $2.0 \times 10^{-3}$ cc/sec.

EXAMPLE 17

A mixture composed of 49.75% by weight of the modified polyphenylene ether obtained in Referential Example 1, 49.75% by weight of modified polypropylene obtained in Referential Example 9, and 0.5% by weight of tri-n-butyl amine was melt-kneaded in the same way as in Example 16, and molded to prepare test specimens. The properties of the test specimens were measured, and the results are shown in Table 4.

A 0.1 mm thick sample cut out from the composition obtained by melt-kneading was observed under an electron microscope. It was determined that the modified polyphenylene ether was dispersed in particles having a size of about 1.0 to 2.0 micrometers. In contrast, in the sample obtained in Comparative Example 8, the dispersed polyphenylene ether had a size of about 5 to 10 micrometers.

REFERENTIAL EXAMPLE 12

Production of modified polypropylene using only the modifier:

Referential Example 9 was repeated except that styrene was not used. The amount of 2-hydroxyethyl acrylate bonded was 3.5% by weight.

COMPARATIVE EXAMPLE 7

Comparative Example 1 was repeated except that the modified polypropylene obtained in Referential Example 12 was used instead of the polypropylene. The results are shown in Table 4.

COMPARATIVE EXAMPLE 8

Comparative Example 1 was repeated except that the modified polypropylene obtained in Referential Example 9 was used instead of the polypropylene. The results are shown in Table 4.

EXAMPLE 18

Example 17 was repeated except that the modified polyphenylene ether obtained in Referential Example 1 and the modified polypropylene obtained in Referential Example 10 were used as the resin components. The results are shown in Table 4.

EXAMPLE 19

Example 17 was repeated except that the modified polyphenylene ether obtained in Referential Example 1 and the modified polypropylene obtained in Referential Example 11 were used as the resin components. The results are shown in Table 4.

TABLE 4

| | Tensile strength (kg/cm$^2$) | Elongation (%) | Chloroform-insoluble portion (%) | Melt flow value (cc/sec) |
|---|---|---|---|---|
| Ex. 16 | 360 | 7.2 | 60 | 0.45 |
| Ex. 17 | 380 | 10.3 | 67 | 0.41 |
| CEx. 1 | 180 | 3.1 | 49 | — |
| CEx. 2 | 250 | 3.3 | 48 | 0.2 |
| CEx. 7 | 127 | 2.2 | 48 | 0.58 |
| CEx. 8 | 270 | 5.1 | 47 | 0.25 |
| CEx. 18 | 360 | 7.4 | 61 | — |
| CEx. 19 | 354 | 8.3 | 64 | — |

As can be seen from the results of Examples and Comparative Examples, the resin compositions of this invention provide molding materials having better solvent resistance, moldability and mechanical strength than known resin compositions of polyphenylene ethers and polyolefins and an excellent balance among these properties. These molding materials are useful in such applications as automobiles and electrical and electronic component parts.

What is claimed is:

1. A solvent-resistant polyphenylene ether resin composition comprising
   (A) a modified polyphenylene ether obtained by modifying a polyphenylene ether with a modifier selected from the group consisting of maleic anhydride, glycidyl methacrylate and glycidyl acrylate in the absence of a radical initiator,
   (B) a modified polyolefin obtained by modifying a polyolefin with styrene and a modifier selected from the group consisting of maleic anhydride, glycidyl mathacrylate and glyoidyl acrylate in the presence of a radical initiator, and
   (C) a binder selected from the group consisting of phenylenediamine, aminobenzoic acid, bisphenol A, terephthalic acid and diepoxy compounds.

2. The composition of claim 1 wherein the modifier for the polyphenylene ether is maleic anhydride and the modifier for the polyolefin is glycidyl methacrylate or glycidyl acrylate, and the binder is p-phenylenediamine.

3. The composition of claim 1 wherein the polyphenylene ether is poly(2,3-dimethyl-1,4-phenylene)ether or 2,6-dimethylphenol/2,3,6-trimethylphenol copolymer.

4. The composition of claim 1 wherein the polyolefin is polypropylene.

* * * * *

UNITED STATES PATENT AND TRADEMARK OFFICE
CERTIFICATE OF CORRECTION

PATENT NO. : 4,914,153

DATED : April 3, 1990

INVENTOR(S) : SHIZUO TOGO, AKIKAZU AMAGAI, YOSHINORI KONDO and TOSHIAKI YAMADA

It is certified that error appears in the above-identified patent and that said Letters Patent is hereby corrected as shown below:

Column 14, line 17, correct the spelling of "glycidyl";

line 27, change "(2,3-dimethyl-" to read --(2,6-dimethyl- --.

Signed and Sealed this

Fifth Day of January, 1993

*Attest:*

DOUGLAS B. COMER

*Attesting Officer*      *Acting Commissioner of Patents and Trademarks*